United States Patent
Sung et al.

(10) Patent No.: US 7,466,867 B2
(45) Date of Patent: Dec. 16, 2008

(54) METHOD AND APPARATUS FOR IMAGE COMPRESSION AND DECOMPRESSION

(75) Inventors: Chih-Ta Star Sung, Glonn (DE); Chih-Sheng Cheng, Taoyuan (TW); Yin-Chun Lan, Wurih Township, Taichung County (TW)

(73) Assignee: Taiwan Imagingtek Corporation, Juhdong (TW)

( * ) Notice: Subject to any disclaimer, the term of this patent is extended or adjusted under 35 U.S.C. 154(b) by 705 days.

(21) Appl. No.: 10/997,048

(22) Filed: Nov. 26, 2004

(65) Prior Publication Data

US 2006/0115166 A1 Jun. 1, 2006

(51) Int. Cl.
| G06K 9/00 | (2006.01) |
| G06K 9/36 | (2006.01) |
| G06K 9/46 | (2006.01) |
| H03M 7/40 | (2006.01) |
| H04N 1/413 | (2006.01) |
| H04N 7/12 | (2006.01) |
| H04N 11/02 | (2006.01) |
| H04N 11/04 | (2006.01) |

(52) U.S. Cl. ............... 382/246; 382/166; 382/238; 341/67; 348/409.1; 358/426.13

(58) Field of Classification Search ............... 382/166, 382/238, 244, 246; 341/67; 348/394.1, 409.1; 358/426.13; 375/240.23
See application file for complete search history.

(56) References Cited

U.S. PATENT DOCUMENTS

| 5,241,381 A * | 8/1993 | Kondo ............... 375/240.01 |
| 5,321,776 A * | 6/1994 | Shapiro ............... 382/240 |
| 7,098,957 B2 * | 8/2006 | Kim et al. ............... 348/452 |
| 7,149,350 B2 * | 12/2006 | Shoda et al. ............... 382/166 |
| 2003/0142751 A1 * | 7/2003 | Hannuksela ............... 375/240.25 |
| 2003/0190092 A1 * | 10/2003 | Dyas et al. ............... 382/298 |
| 2005/0246178 A1 * | 11/2005 | Fejzo ............... 704/500 |

OTHER PUBLICATIONS

Bhaskaran et al. ("Image and Video Compression Standards—Algorithms and Architectures," Kluwer Academic Publication, 2nd ed., 1997, pp. 38-39 & 49-52).*

Weinberger et al. ("The LOCO-I Lossless Image Compression Algorithm: Principles and Standardization into JPEG-LS," IEEE Trans. Image Processing, vol. 9, No. 8, Aug. 2000. pp. 1309-1324).*

* cited by examiner

*Primary Examiner*—Yubin Hung

(57) ABSTRACT

An image compression method for compressing groups of pixel data, including the following steps: MSB portions and LSB portions of the pixel data are compressed separately. Further, the LSB portions are grouped according to their associated MSB portions so that similar pixels are compressed together to gain higher a compression ratio. Some LSB portions are truncated to ensure a compression ratio. When performing compression, enhanced variable-length coding is adopted that predicts more accurate dividers by considering weighted combination of adjacent pixels. The quotient of each groups of compression portion is predicted and coded accordingly.

17 Claims, 12 Drawing Sheets

METHOD AND APPARATUS FOR IMAGE COMPRESSION AND DECOMPRESSION

BACKGROUND OF THE INVENTION

1. Field of Invention

The present invention relates to image compression/decompression, and more particularly relates to the reference image compression/decompression for achieving a predetermined compression ratio.

2. Description of Related Art

Digital image and motion video have been adopted in an increasing number of applications, which include digital camera, scanner/printer/fax machine, video telephony, videoconferencing, surveillance system, VCD (Video CD), DVD, digital TV . . . etc. In the past decades, ISO and ITU have separately or jointly developed and defined some digital video compression standards including JPEG, JPEG2000, JBIG, MPEG-1, MPEG-2, MPEG-4, MPEG-7, H.261, H.263 and H.264. The success of development of the still image and video compression standards fuels wider applications. The advantage of image and video compression techniques significantly saves the storage space and transmission time without sacrificing much of the image quality.

There are essentially three types of picture encoding in the MPEG video compression standard. I-frame, the "Intra-coded" picture uses the block of 8×8 pixels within a frame to code itself. P-frame, the "Predictive" frame uses previous I-frame or P-frame as a reference to code the difference. B-frame, the "Bi-directional" interpolated frame uses previous I-frame or P-frame as well as the next I-frame or P-frame as references to code the pixel information. In principle, in the I-frame encoding, all "Block" with 8×8 pixels go through the same compression procedure that is similar to that of JPEG, the still image compression algorithm including the DCT, quantization and a VLC, the variable length encoding. Meanwhile, the P-frame and B-frame have to code the difference between a target frame and the reference frames.

In the non-intra picture encoding, the first step is to identify the best match block followed by encoding the block pixel differences between a target block and the best match block. For some considerations including accuracy, performance and encoding efficiency, a frame is partitioned into macroblocks of, for instance 16×16 pixels for estimating the block pixel differences and the block movement, called "motion vector", the MV. Each macro-block within a frame has to find the "best match" macro-block in the previous frame or the next frame. The procedure of searching for the best match macro-block is called "Motion Estimation." A "Searching Range" is commonly defined to limit the computing times in the "best match" block searching. For example a +/−16 pixels in X-axis and +/−16 in Y-axis surrounding the target block. According to the MPEG standard, a macro block is composed of four 8×8 "blocks" of "Luma (Y)" and one, two or four "Chroma (Cb and Cr)". Since Luma and Chroma are closely associated, in the motion estimation, there is need of the estimation only for Luma, the Chroma, Cb and Cr in the corresponding position copy the same MV of Luma. The Motion Vector, MV, represents the direction and displacement of the movement of block of pixels. For example, an MV=(5,−3) stands for the block movement of 5 pixels right in X-axis and 3 pixel down in the Y-axis.

The reference frames 28, 29, 218, 219 video encoding and decoding as shown in FIG. 2A and FIG. 2B occupy high amount of storage device which are most commonly stored in off-chip memory buffer 27, 217 RAM. Transporting pixels between a video encoder or decoder chip and the memory buffer consumes high bandwidth of the I/O bus of memory storing the frame buffers. Besides, the on-chip image buffer storing the searching range pixels 25 in encoder and temporary block 215 of reference blocks occupy a lot of silicon die area in VLSI design. For instance, in the main profile MPEG 2 encoder with 720×480 pixel per image, the 2 reference frames of 4:2:2 format requires a total of 1,036,800 Byte of reference memory and ~64K bits of on-chip storage device to store the image of searching range. Compressing the reference frames by a factor of 1.5× to 2.0× stands for a potential of replacing the 2 Million Byte DRAM by a 1 Million Byte DRAM.

In summary, due to the need of reference memory buffer of previous and future frames and the need of a image buffer for temporarily storing the pixels of searching range, the cost of the reference memory buffer and on-chip searching range buffer are increasingly large with the increase of image resolution. From the bandwidth point view, the frequent accessing the mass image data consumes high power and causes I/O traffic jam which usually slow down the performance of compression and some times degrade the quality of image.

Therefore, it is beneficial to reduce the required amount of storage devices of the reference frames or on-chip buffer for storing pixels of searching range.

SUMMARY OF THE INVENTION

The present invention is related to a method and apparatus of the reference image buffer compression, which plays an important role in image compression, specifically in compressing the referencing frame buffer for the motion video compression. The present invention significantly reduces required storage device density and accessing bandwidth of the referencing image.

The present invention of the reference image compression includes procedures and apparatus of compressing the reference frame pixel data by a procedure of separating the MSB bits and LSB bits of the DPCM coded pixels difference between adjacent pixels.

The present invention of the reference image compression detects the variance of MSB bits of the DPCM code and determines whether the MSB and LSB bits to be compressed separately or not.

The present invention of the reference image buffer compression detects the the variance of MSB bits of the DPCM code by comparing the values of difference between adjacent pixel, if the DPCM value is "0", the possibility of high similarity of adjacent pixels is high.

According to an embodiment of the present invention of the reference image buffer compression, when MSB bits of the DPCM code has continuous "0s" which means high similarity of adjacent pixels and the corresponding LSB bits will be re-ordered and be compressed by a VLC coding, the rest of LSB bits will be coded by either distributed truncation or by keeping original values.

According to an embodiment of the present invention of the reference image buffer compression, the MSB bits within a compression block of the DPCM code will be coded by a VLC coding algorithm.

According to an embodiment of the present invention of the reference image buffer compression, the re-ordered LSB bits with high potential of similarity within a compression block of the DPCM code will be coded by a VLC coding algorithm.

According to an embodiment of the present invention of the reference image buffer compression, re-ordering of the LSB bits is done by referring to the MSB bits by gathering LSB bits together for MSB bits having values of "continuous 0s". If no continuous 0s are found, the LSB bits will be compressed by a VLC coding algorithm.

According to an embodiment of the VLC coding algorithm of the MSB, LSB or the re-ordered DPCM codes of the present invention of the reference image buffer compression, only the "Quotient" and "Remainder" are coded with the "Divider" implicitly done by prediction.

According to an embodiment of the VLC coding algorithm of the MSB, LSB or the re-ordered DPCM codes of the present invention, the "Quotient" is coded by a prediction means.

According to an embodiment of truncation of LSB or the re-ordered DPCM codes of the invention, if the MSB bit of the bits to be truncated is "1", it will be carried to the next more significant bit, if "0", it will be directly discarded.

According to an embodiment of the present invention of the reference image compression, the distribution of truncating bits will not start from the same position hence avoid accumulation of error over time.

According to an embodiment of the present invention of the reference image compression, the block size of pixels are tradeoffs among compression rate, image quality, latency of accessing and ease of design.

According to an embodiment of the present invention of the reference image compression, under the requirement of a fixed compression rate, the bit rate of Y (Luma) and UN (Chroma) are put together as a compression unit in allocating the bit rate distribution and truncation.

According to an embodiment of the present invention of the reference image compression, adaptively change the block size from block to block is applied to achieve higher performance and still maintain high compression rate and good quality.

According to an embodiment of the present invention of the reference image compression, double hardware of encoder and decoder are proposed in this invention for further enhance the performance of encoding and decoding with reduced latency time in recovering the $1^{st}$ pixels and a block of pixels.

It is to be understood that both the foregoing general description and the following detailed description are by examples, and are intended to provide further explanation of the invention as claimed.

DESCRIPTION OF THE PREFERRED EMBODIMENTS

In a preferred embodiment according to the present invention, an image compression method for compressing groups of pixel data includes steps of compressing MSB (most significant bits) portions and LSB (least significant bits) portions of each group of pixel data separately. If a pixel data is composed of 8 bits, an example of the MSB portion is the left four bits and the LSB portion is the right four bits. However, the MSB portion may be defined as left five or other number of bits and the LSB portion is the rest bits. Adopting this step would enhance compression ratio because there is a nature that MSB portion usually have more resemblance comparing with LSB portions. The pixel data can be raw pixel information or data processed after quantization, DCT, and/or obtained by subtracting a reference value from raw pixel information.

In addition, the LSB portions are grouped according their associated MSB portions so that different compression methods, e.g. variable-length coding, can be applied on those in a group and those are not. For those LSB portions in a group, they usually have more resemblance and are suitable to be compressed together to gain higher compression ratio. Moreover, to ensure the total compression ratio is under a predetermined ratio, a variance level that indicates the variation range of the MSB portions is used for determining whether to truncate some LSB portions.

In another preferred embodiment according to the present invention, the compression schema mentioned above is applied in image processing systems, like scanners, digital cameras, LCD displays, VCD/DVD players, etc. In such processing system, a temporary memory buffer is necessary for holding reference image data used in process target image data. A codec interface is designed for instantly compressing/decompressing the reference image data. The MSB portions and LSB portions of the reference image data are compressed separately to gain higher a compression ratio.

More detailed examples below are provided for explaining the spirits of the present invention.

Figure 2A:
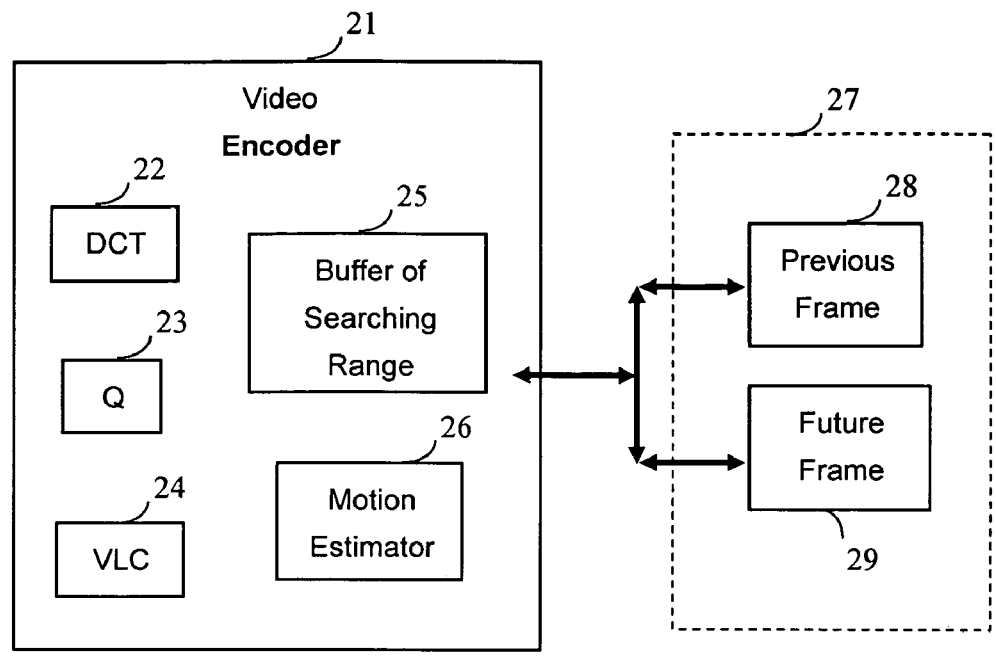
FIG. 2A depicts a block diagram of a commonly adopted video compression/encoding subsystem with reference frames.

FIG. 2A shows a block diagram of the MPEG video compression (encoding), which is adopted by most video compression IC and system suppliers. Main blocks in this video encoder design include DCT 22, Discrete Cosine Transform, Quantization 23 and VLC 24, Variable Length Coding which are similar to the JPEG, a still image compression. The Motion Estimator 26 calculates SAD, Sum of Absolute Difference of each point of macroblock and identifies the "Best Match" macroblock between the present frame and a previous frame 28 or a next frame 29 which are stored in a storage device as reference frame buffer 27. An on-chip buffer 25 is designed to store image of the searching range of reference frames.

Figure 2B:
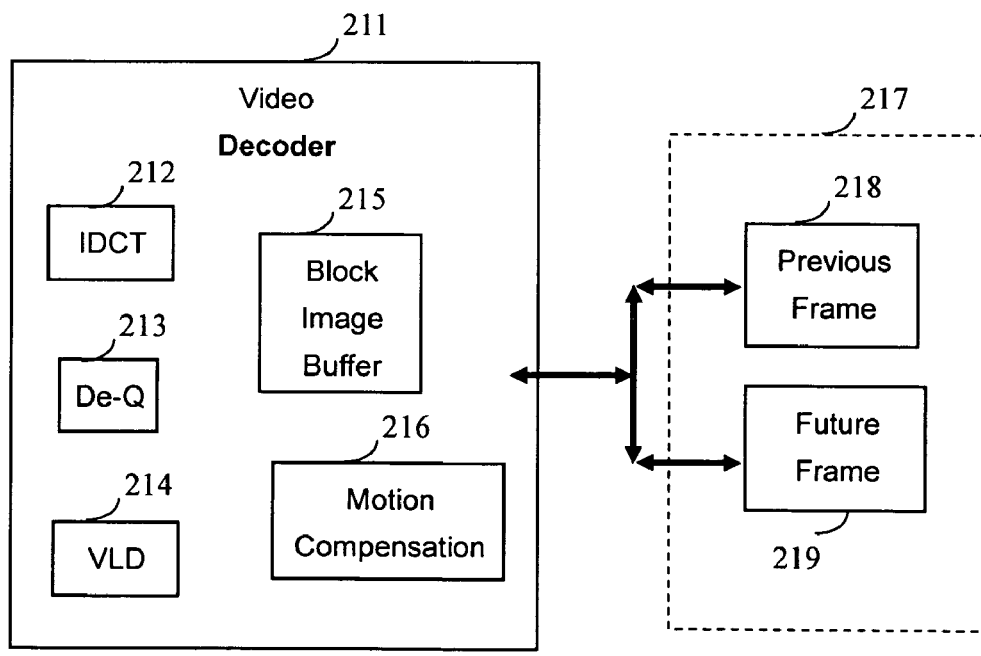
FIG. 2B depicts a block diagram of another commonly adopted video decompression/decoding subsystem with reference frames.

A commonly adopted MPEG decoder design is illustrated in FIG. 2B which includes an IDCT 212, inverse Discrete Cosine Transform, De-Quantization 213 and VLD 24, Variable Length Decoding. In decoding an image from a video stream, the decoder 211 receives image from the reference frames 218, 219 and temporarily stored into a buffer of block image 215 for image recovering by a procedure of "motion compensation" 216. The motion compensation recovers a block image by adding the reference image data into the difference of block of image which is decoded from the video decoding procedure of IDCT, De-Q (De-quantization) and VLD as previously stated.

Since some high frequency data within a reference frame composed of re-constructed block pixels are filtered out through quantization in encoding, the correlation between pixels of the reference frame is high and the lossless image compression should be able to achieve 2× compression rate with high image quality for most pictures of a video sequence. With this lossless or near lossless compression technology, the cost of storage device for instance, a SDRAM of saving the reference frame can be cut in half, it is even feasible to integrate the referencing frames buffer with the video compression engine since the buffer size is around half of that without compressing the reference image.

Figure 3:
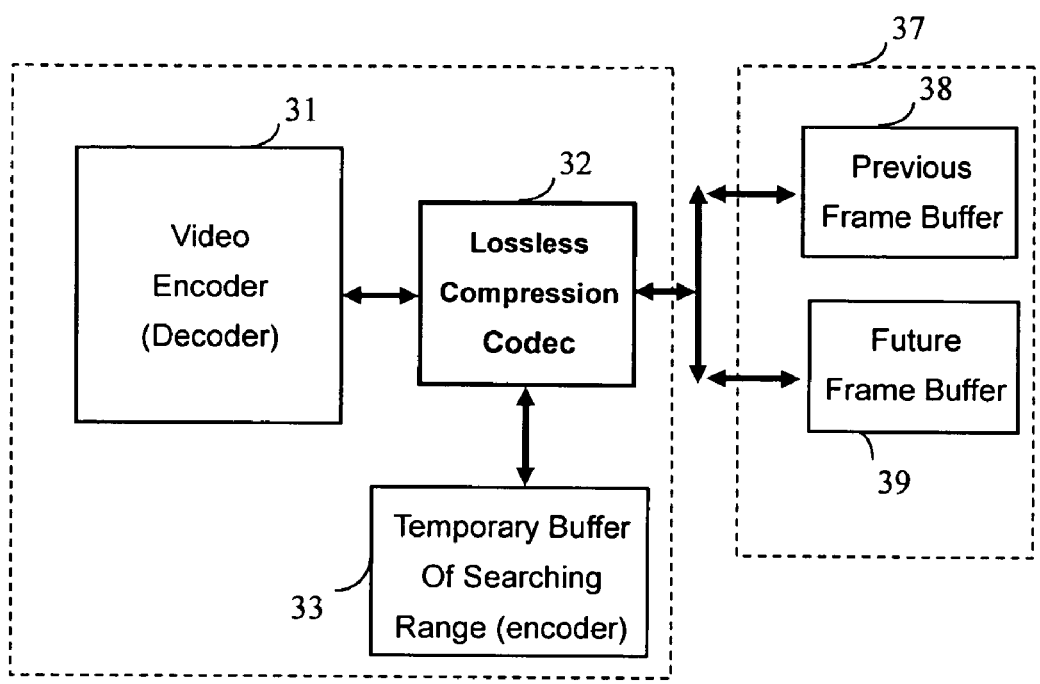
FIG. 3 depicts a block diagram of the present invention of the compression/encoding and decompression/decoding subsystem with compressed reference frames.

FIG. 3 illustrates the block diagram of the video compression encoding 31 and decoding which incorporates the implementation of the present invention of referencing frames buffer pixel data compression. The compressed I-type or P-type frame is re-constructed through a reversing process of compression. The re-constructed I-frame and P-frame pixels are fed into an image compression codec 32 which compresses pixel data by taking the advantage of high pixel correlation between adjacent pixels by applying the $1^{st}$ step of DPCM, Differential Pulse Coded Modulation means plus a kind of VCL, Variable Length Coding means which will be described in details in the following paragraphs of this section.

For avoiding long latency in accessing and re-constructing the expected pixels, and for ease of design of the memory control, a fixed block size of pixel as a compression unit is determined in this present invention of both video compression and decompression. The determined block size includes but not limited to 8 pixels, 16 pixels, 32 pixels, 64 pixel, 128 pixels and 256 pixels. The compressed reference frames of "previous frame" and "next frame" images with reduced amount of data will be then stored into the image buffer for future use in video compression as reference images. When encoding the present frame of a video sequence, the image compression codec 32 receives the compressed image of reference frames, decodes and recovers a specified amount of pixels of the searching range according for the procedure of the so called "motion estimation" which is to identify the "best matching" block for each macroblock within the present frame of images.

Figure 1A:
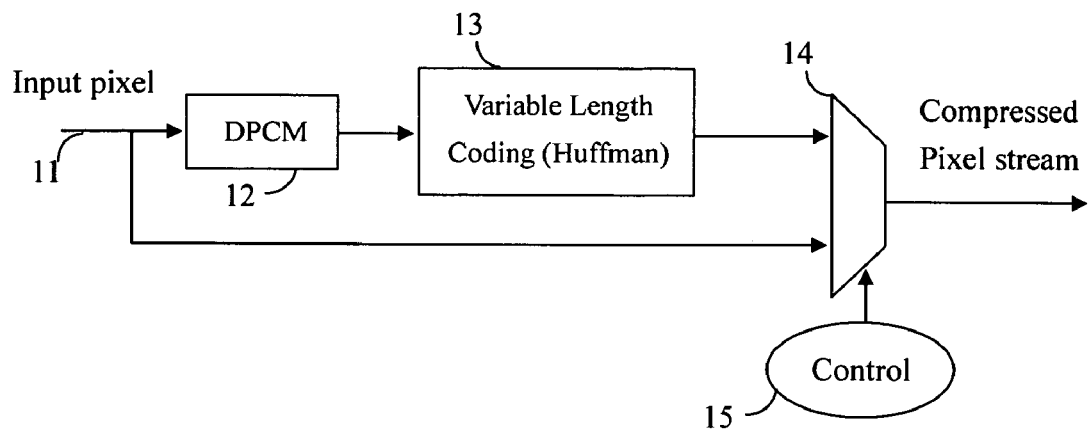
FIG. 1A illustrates a prior art of lossless compression with means of a DPCM and a VLC coding.
Figure 4:
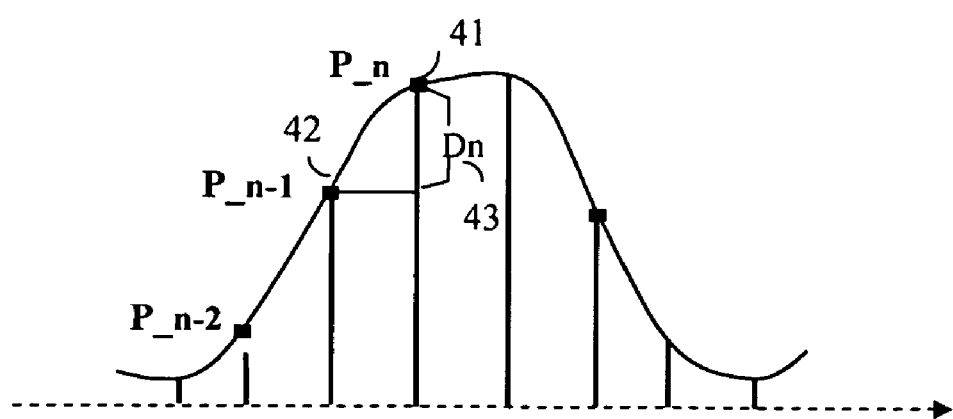
FIG. 4 depicts the calculation of the DPCM values.

Higher compression rate means lower cost of storage devices and ease of bandwidth requirement of IO pins for accessing the storage devices. From the other hand, if image quality can be traded for compression rate, for a fixed compression rate, the image quality can be better with the potential of achieving higher compression rate when tradeoff of imafe quality and compression rate are optional. So, many designs have been tried to achieve high compression rate. FIG. 1A depicts a commonly used prior art lossless image compression with DPCM 12 and a VLC 13 coding. FIG. 4 illustrates the DPCM means which calculates Dn 43, the differences between adjacent pixels of P_n 41 and P_n−1 42 or takes the difference between a predicted value and the target pixel. The DPCM code is a lossless value which easily reduces the value of pixels by taking the difference of adjacent pixels. The coming pixel 11 is coded by the $1^{st}$ step of a DPCM coding and is sent to go through a process of so called the VLC coding 13. When the pixels of an image has high complexity, the prior art of DPCM+VLC might not be able to achieve a compression rate of 1.0×. Since the process of DPCM and VLC don't guaranty a higher than 1.0× compression rate, some prior arts implement a control machine 15 to decide whether the image is to go through the DPCM+VLC coding or keep original value which is switched by a MUX 14, a multiplexer.

Figure 1B:
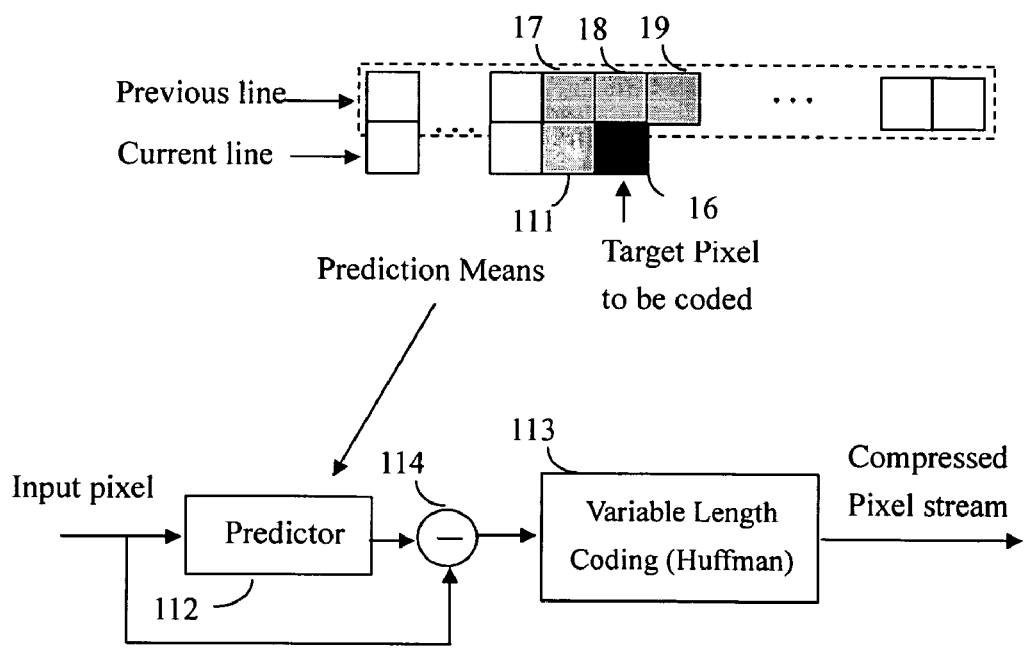
FIG. 1B illustrates another prior art of lossless compression with another means of prediction and a VLC coding.

Another prior art of lossless compression is shown in FIG. 1B. In this algorithm of lossless compression, a target pixel 16 is subtracted by a predicted value which is calculated by a weighted factor of surrounding pixels 17, 18, 19, 111. It is commonly knowledgeable that the more pixels put together for predicting a targeted pixel, the more accurate value one can predict and the less differential value between target pixel and the predicted value. The less differential value between a target pixel and the predicted value, the shorter code will be needed to represent it. In the prior art of FIG. 1B, the surrounding pixels include some pixel on top of the target pixel which requires a buffer of storing a top line of pixels. The predicted value of pixel is subtracted 114 before being sent to a VLC coding 113. The surround pixels includes at least one left pixel in the same row of pixel which together with top line makes the requirement of 2 lines of pixel for predicting the value of the target pixel. The storage device of 2 lines pixels is very costly. Cost of implementation of this invention is one of key considerations and will there be need of only a few pixels of data as reference pixels in the small temporary buffer.

Figure 5:
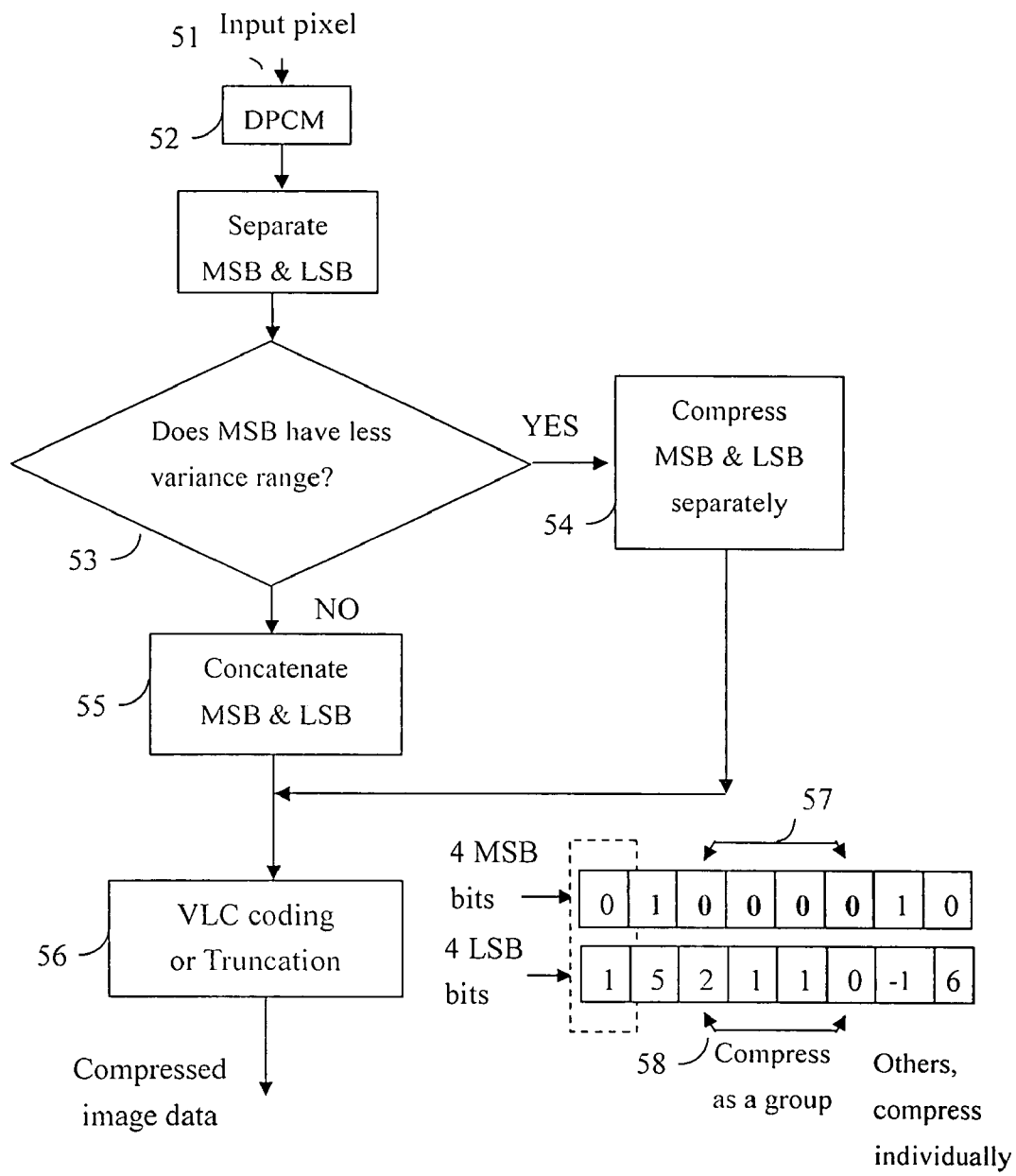
FIG. 5 depicts a flowchart of the image compression of the present invention of the reference frame image compression.

FIG. 5 depicts the flowchart of deciding how the DPCM code is further compressed in the present invention of reference frame compression. If the image pattern of a compression group of pixels is not complex, the pixel correlation is close and the difference between adjacent pixels will be small and more predictable. And the values of DPCM coded pixels will be small and easy to achieve compression rate for the DPCM coded data.

When the image pattern changes sharply, the DPCM values will vary abruptly and difficult in taking advantage of continuous small value of DPCM codes, but the MSB bits still have higher potential of smaller difference between pixels. Therefore, separating the MSB from LSB and compressing them separately in complex image pattern achieves shorter code of representing the DPCM coded values. An target pixel 51 goes through the procedure of the DPCM 52 firstly before it is separated to be MSB bits and LSB bits 57 with a certain length, for example 4 bits, of each in MSB and LSB bits.

The variance range of the MSB bits 53 are used to determine whether a group of pixels has high correlation or not, and the MSB and LSB should be coded separately or jointly accordingly. If YES, the MSB and LSB of the DPCM coded pixel value will be coded separately 54, if NO, the DPCM coded group of pixel will be coded without separating the MSB from LSB bits. When separately compression is decided, both MSB and LSB will be coded by a means of VLC 46 coding. The right bottom of FIG. 5 depicts an example of a group of 8 pixels, the separated MSB and LSB and the means of deciding how to re-order the group of pixels for LSB bits when coding a group of pixels with close correlation or individually for those don't show close correlation. MSB bits are less variable than the LSB bits of the DPCM code within a block. "0" in MSB of the DPCM code statistically represents smaller value of LSB and higher potential of close correlation between adjacent pixels. The continuous "0" of MSB bits 57 of the DPCM code is therefore used to determine which bits of LSB 58 and re-ordered bits are coded by VLC coding or by truncation 56. Truncation causes data loss which is needed only when the bit rate of going through VLC compression is out of budgeted bit rate.

Figure 6:
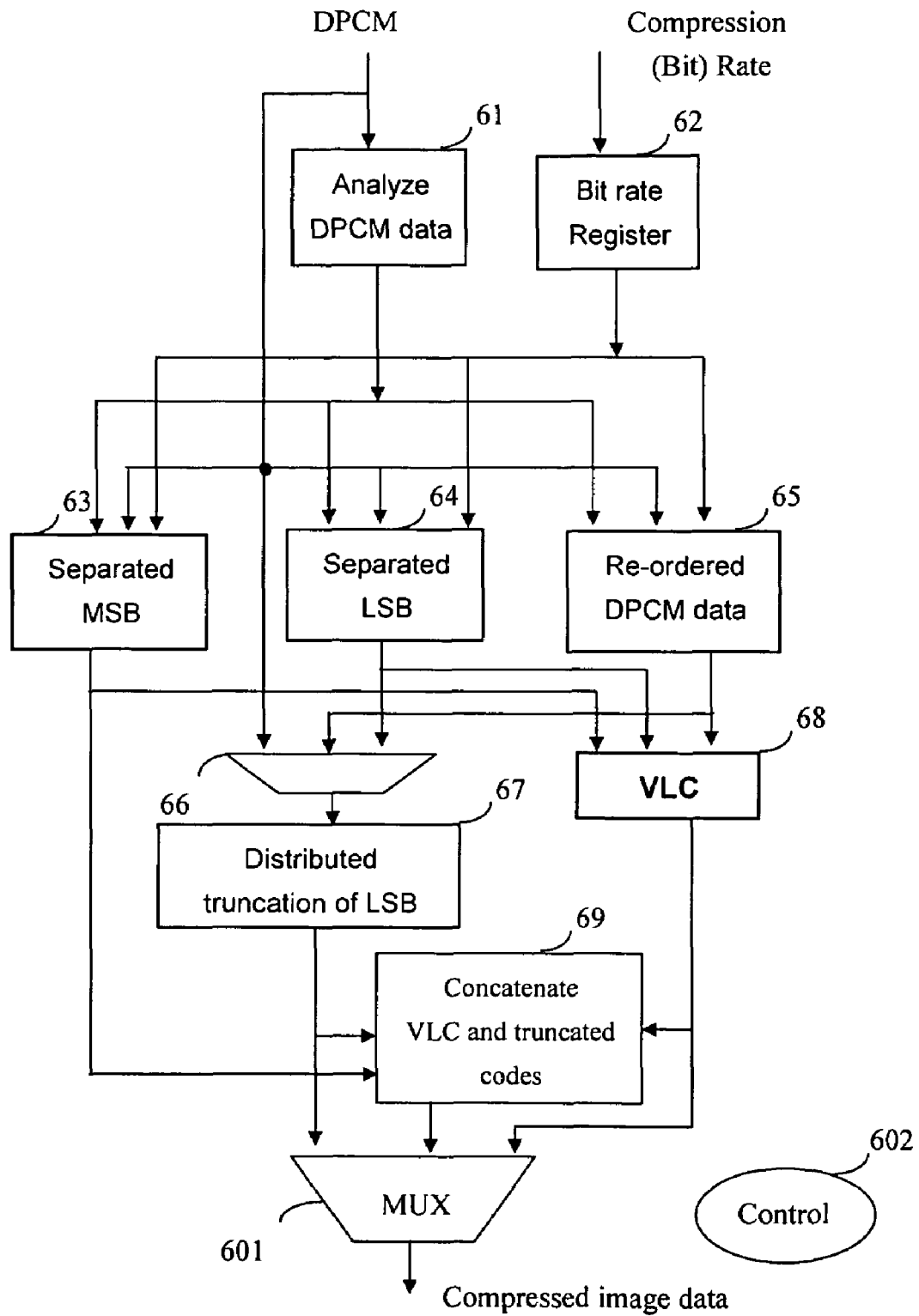
FIG. 6 illustrates the block diagram of the compression of the reference frames.
Figure 7:
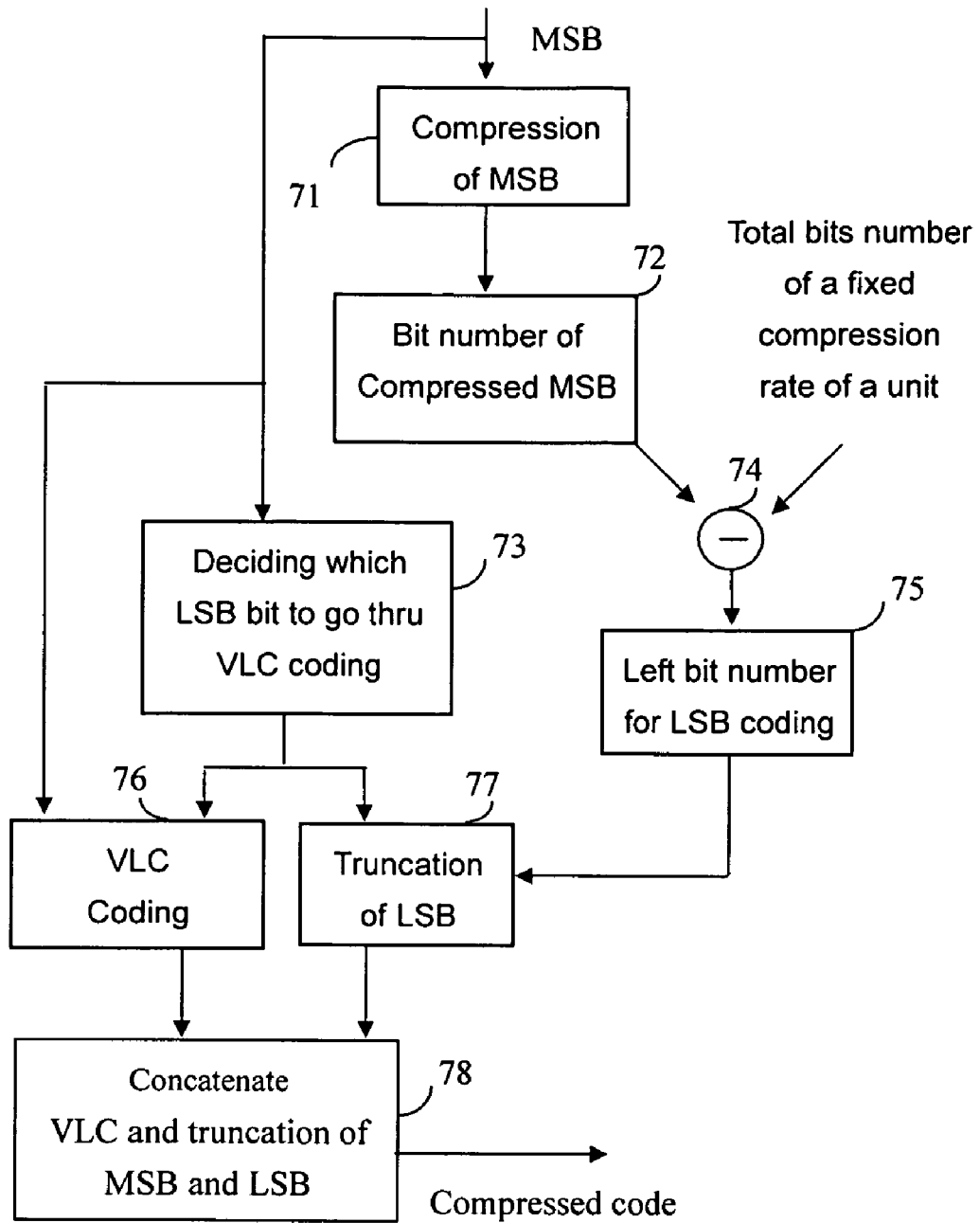
FIG. 7 depicts the procedure of deciding VLC coding and truncation of the LSB bits.
Figure 10:
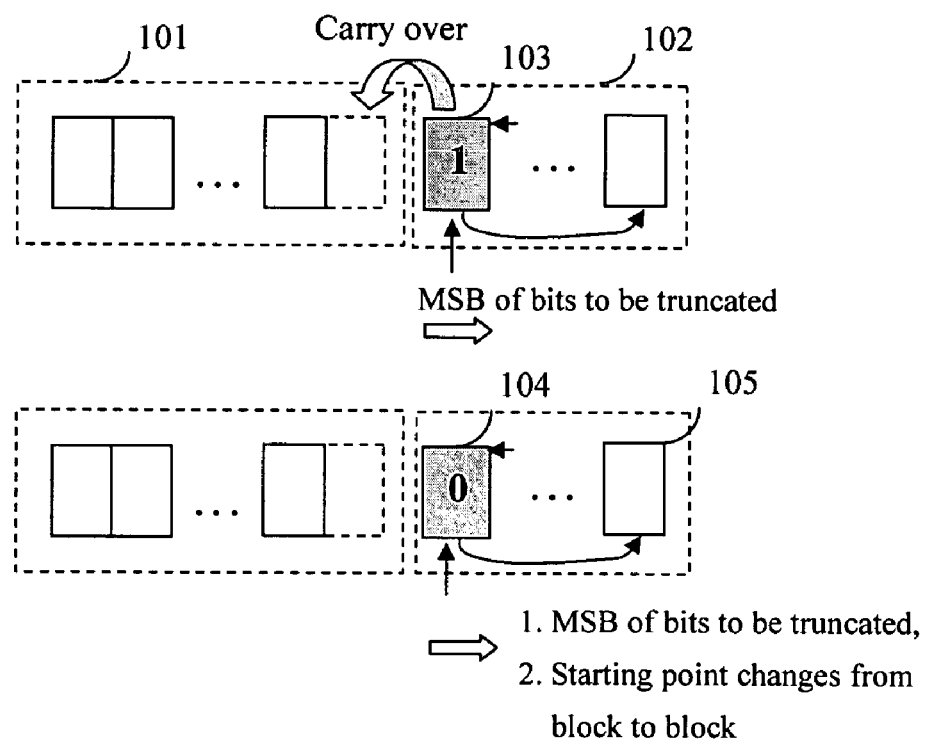
FIG. 10 depicts the means of truncation and the rotation of starting bit of truncation.

FIG. 6 illustrates the block diagram of the procedure of how the DPCM code of a compression block is to be coded. The DPCM coded data is analyzed 61 by examining the MSB bits to decide which pixels have close correlation. A register 62 is used to store the bit rate which is used to determine how many bits are allowed to one block of pixels, The DPCM analyzed result together with the bit rate indicate are fed into the MSB 63 and LSB bits 64 and the re-ordered pixels 65 to decide which pixels need to be compressed by VLC coding 68 and which pixels need to be selected by a MUX 66 to go through the truncation 67 with distributed means of dropping bits. The last step is to concatenate 69 the compressed pixel data and the truncated pixel data to form a final code with the MSB bits selecting by a MUX 601 the output code of the DPCM data. The bit number 72 of the compressed MSB bits as shown in FIG. 7 is subtracted 74 from the total bit number of a fixed bit rate of a block of compression unit and becomes the budgeted amount 75 left for LSB compression. The MSB bits determine which pixel of the VSB bits of DPCM code shall go thru VLC coding 73 and which need to go through truncation by examining which MSB of DPCM are "0". All MSB bits and those LSB bits 76 with the corresponding MSB having continuous "0s" shall be compressed together by a kind of VLC coding. The resting LSB bits will be kept as original DPCM value or coded by VLC or by truncation 77. To avoid accumulating error from frame to frame caused by truncation, the bits to be truncated will be randomly rotated from block to block overtime as shown in FIG. 10.

Figure 8:
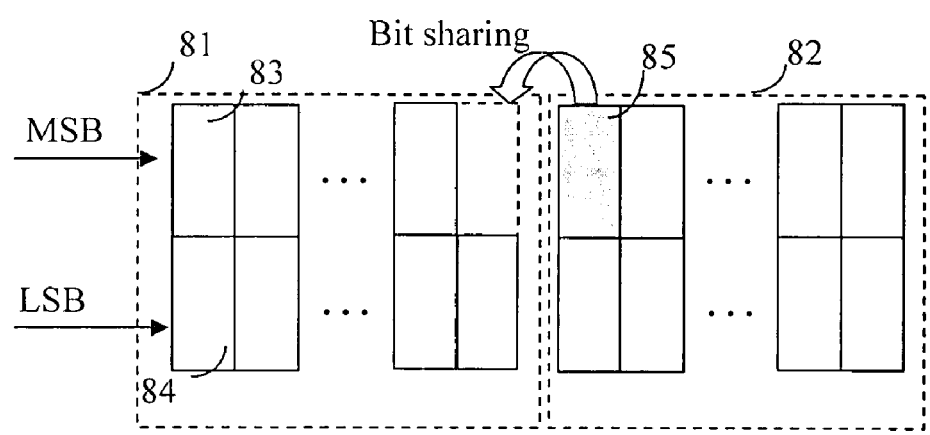
FIG. 8 depicts the means of sharing the referencing bit of two compression units.

In the DPCM coding, an MSB bit of a reference pixel 85 shared by two blocks 81, 82 of compression pixels as shown in FIG. 8. The DPCM coding of left block 81 takes differential values from right pixel to left pixel, while the right block 82 is from right pixel to left Sharing reference pixel saved bit number and achieve higher compression rate or better image quality.

Figure 9:
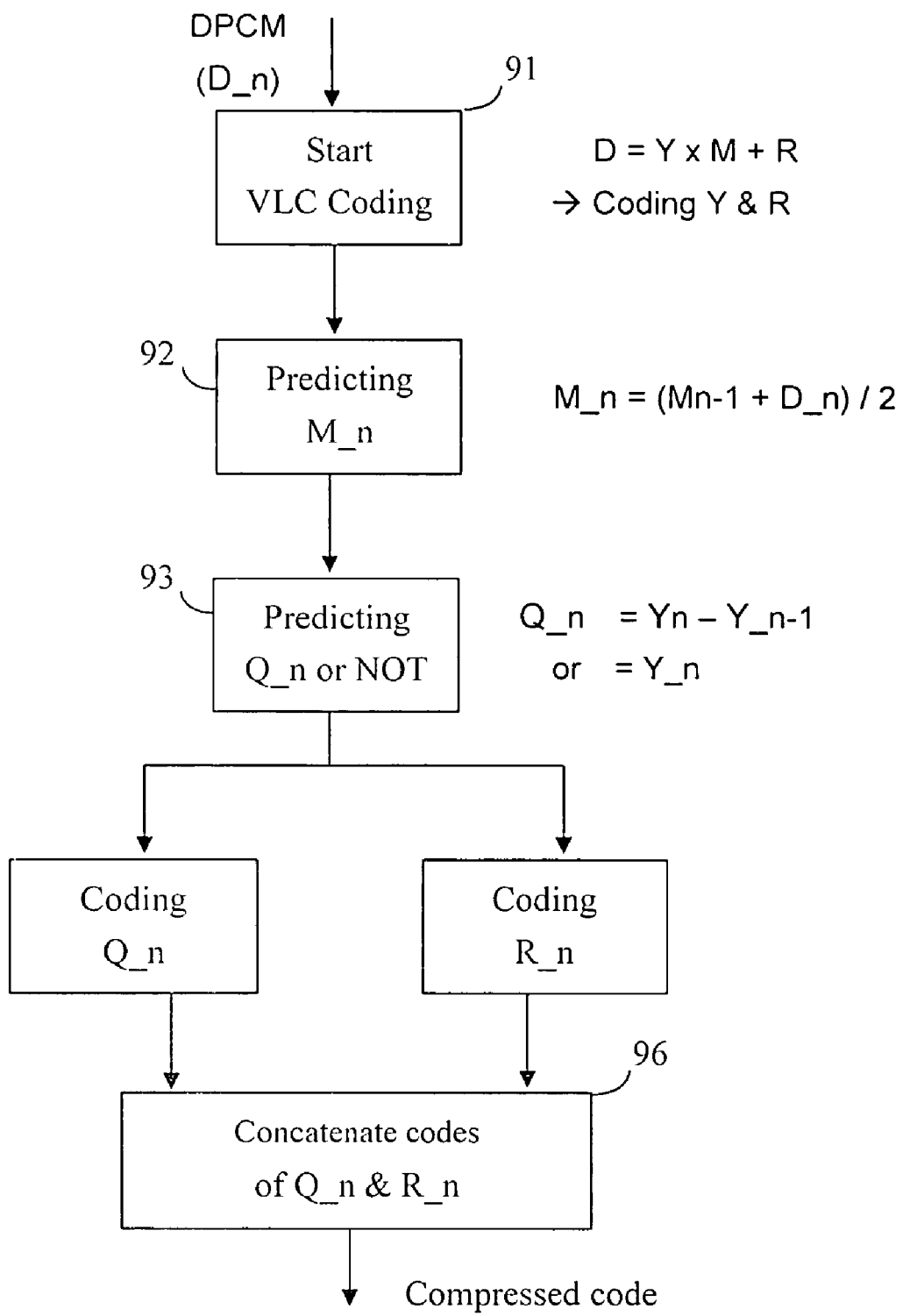
FIG. 9 depicts the procedure of the VLC coding of the present invention of the reference frame image.

FIG. 9 depicts the flowchart and the principle of the VLC coding applying to the present invention of the reference frame compression. The DPCM coded difference, Dn between adjacent pixels starts the 1$^{st}$ step of VLC coding 91.

$$D\_n = Y \times M + R \text{ (Y: Quotient, M: Divider, R: Remainder)} \quad \text{Eq. (1)}$$

the "Quotient" and "Remainder" are coded with the "Divider" implicitly done by prediction. For example: 12=2× 5+2

In the VLC coding of this invention, the Y=1 and R=2 are the only two parameters needed to be coded with the M=5 implicitly predicted by an average of weighted factors times Ms of previous pixels. 1$^{st}$ step of the VLC coding is to predict the value of M. Eq. (2) illustrates the means of predicting the value of M.

$$M\_n = (M_{n-1} + D\_n)/2 \quad \text{Eq. (2)}$$

As one can see that the Dn of the closest previous pixel has highest weight of ½, the next pixel will have a factor of ¼, ... etc. the farer the pixels, the lower value the weighted factors and less influence to the present pixel in predicting the M.

Since the M can be predicted by calculated values of M 92 of previous pixels, there is no need to store the value of M. The coding of R is based on binary coding. Taking last example, the R=2 will be coded by two bits of "10". The Y will be coded by continuous "0" and stopped by adding "1". For instance, Y=3 will be coded by 0001. According to an embodiment of the VLC coding of this invention, the Y (Quotient) will be coded by predicted value which means coding Q_n, the difference of quotients of Y_n and Y_n−1 (Q_n=Y_n−Y_n−1). Since the predicted Q_n does not guarantee a shorter code, only when being able to achieve shorter code will the means of predicting the Q_n will be applied. A group of Ys will be examined to decide whether the prediction of Q_n makes Q_n 93 code shorter. The final step is to concatenate 96 the predicted and coded Q_n and the R (Remainder of binary code).

The above methods have significantly improved the compression rate and quality of the compressed reference frames. Additional two methods are applied to further achieve higher compression rate and from the other hand, to improve the image quality with a fixed bit rate.

Figure 11:
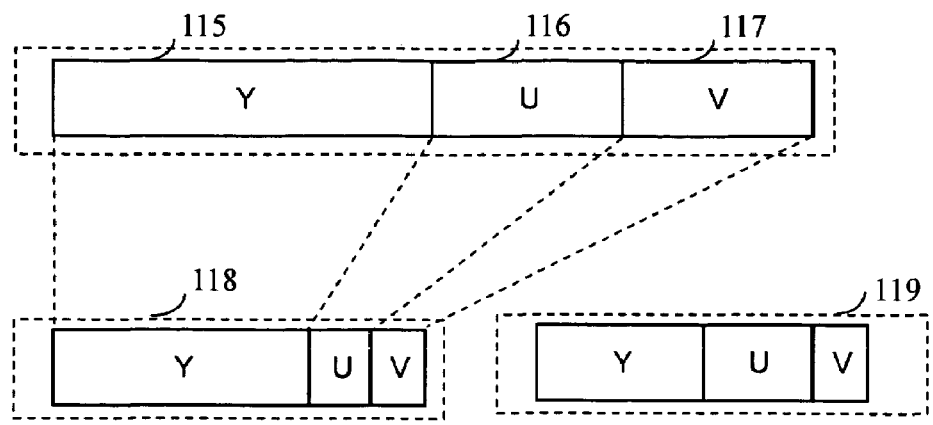
FIG. 11 depicts the variable compression rate of Y, U and V within a block with a fixed block compression rate.

The first is to allow variable compression ratios in different attributes of a color space, e.g. among Y, U and V, within a compression unit with still fixed compression rate of a unit of compression as illustrated in FIG. 11. A block of pixels 114 comprising for instance 16 pixels (total of 32 bytes) of 4:2:2 Y 115 U 116 V 117 format can be compressed into 12 bytes of Y and 2 bytes of U and 2 bytes of V (final of a total of 16 bytes 118).

Figure 12:
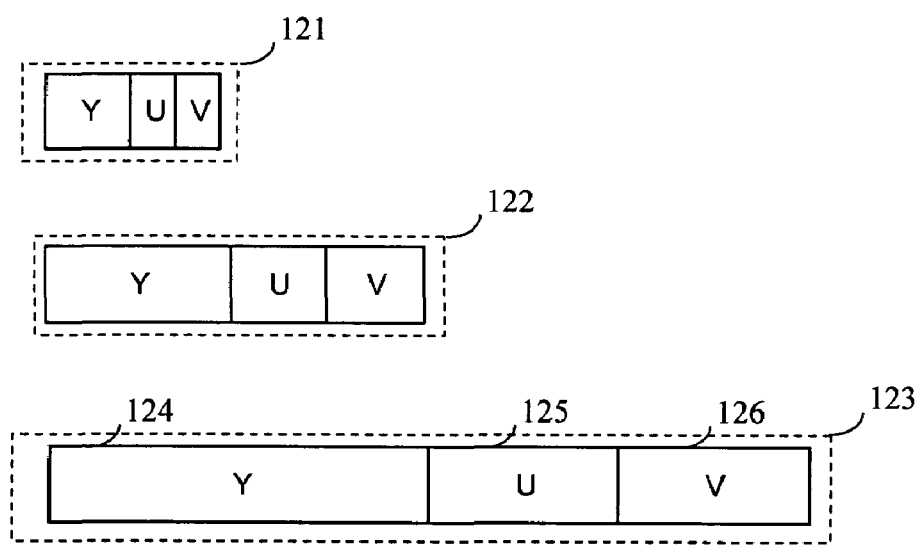
FIG. 12 depicts the variable block size of a compression unit.
Figure 13:
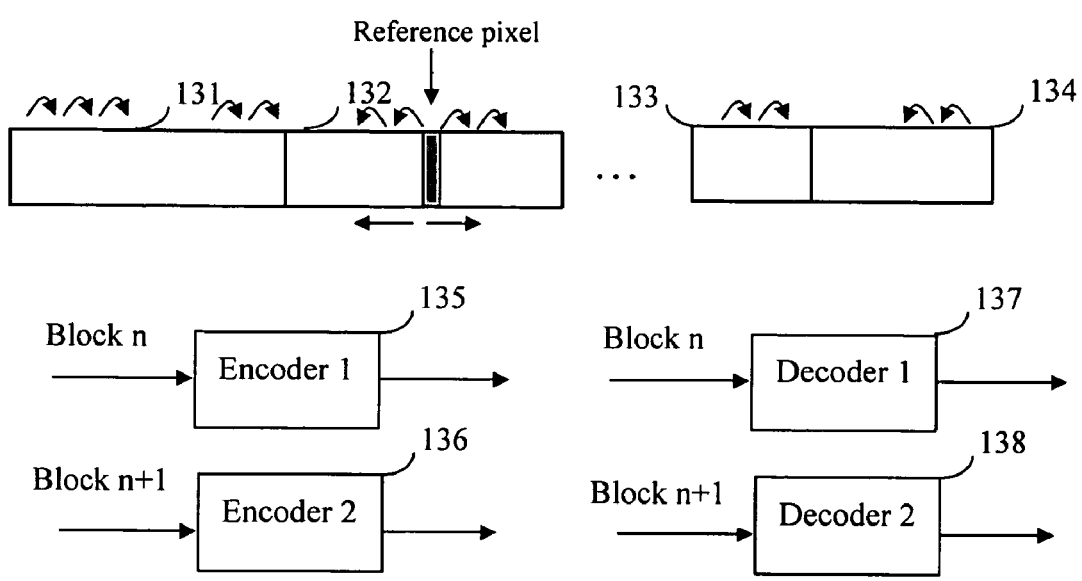
FIG. 13 depicts the means of starting point of encoding and decoding and a scheme of performance enhancement with double hardware and two direction of accessing pixel data.

Another method is to adopt different block size in different applications. A block of 16 pixels can also be reduced to 8 bytes of Y and 4 bytes of U and 2 bytes of V (final of a total of 16 bytes 119). Since the more pixels put into a block as a compression unit the higher compression rate one can achieve. FIG. 12 illustrates another method of compression rate and quality enhancement which is a means of adaptively applying variable size of block of pixels. A block of 8 pixels 121, 16 pixels 122, 32 pixels 123 and even long (like 512 pixel per block) are allowed. In some applications, higher performance of encoding and decoding are critical. The present invention applies "double hardware" means of implementing two encoders 135, 136 and two decoders 137, 138 as shown in FIG. 13. By applying double hardware mean, encoding procedure can start from beginning of a block 131, 133 as well as from end of a block 132, 134. This is an easy way of ping-pong scheme which achieves higher performance with potential of short latency in accessing and recovering a block of pixels.

It will be apparent to those skills in the art that various modifications and variations can be made to the structure of the present invention without departing from the scope or the spirit of the invention. In the view of the foregoing, it is intended that the present invention cover modifications and variations of this invention provided they fall within the scope of the following claims and their equivalents.

What is claimed is:

1. An image compression method for compressing groups of pixel values, comprising:

calculating a variance of the MSB portions of the pixel values of each group; and If the variance is less than a predetermined threshold, then compressing MSB portions of the pixel values of said each group into first compressed data and compressing LSB portions of the pixel values of said each group into second compressed data; otherwise compressing the pixel values of said each group without separating them into MSB and LSB portions.

2. The method of claim 1, wherein compressing LSB portions comprises:
searching said each group to determine whether there are at least two pixel values with different LSB portions but the same MSB portions; and
compressing the LSB portions of the at least two pixel values of said each group and the LSB portions of the rest of the pixel values of said each group separately if the at least two pixel values are found.

3. The method of claim 2, wherein compressing LSB portions further comprises:
determining a compression criteria according to the variance of the MSB portions for compressing LSB portions associated with said MSB portions.

4. The method of claim 3, wherein compressing LSB portions further comprises:
truncating a subset of the LSB portions before compression if the variance of the MSB portions exceeds a predetermined threshold so that a sum of the amount of the first compressed data and the amount of the second compressed data is less than a predetermined number.

5. The method of claim 4, wherein LSB portions in said subset are from pixel values at different locations of lines within an image to be compressed.

6. The method of claim 4, wherein compressing LSB portions further comprises:
performing a carryover operation to the MSB portions corresponding to the LSB portions in said subset if all bits of each LSB portion in said subset have a value of 1.

7. The method of claim 1, wherein each pixel value is obtained by subtracting a reference value corresponding to the same pixel from an original value of the same pixel.

8. The method of claim 1, wherein compressing MSB portions and compression LSB portions each comprises, for each portion:
calculating a weighted sum of a plurality of portions adjacent to said portion;
dividing the value of said each portion by a divider to obtain a quotient and a remainder; and
representing the quotient and the remainder by a code that includes a marker bit separating the quotient part of the code and the remainder part of the code.

9. The method of claim 8, wherein the divider is calculated by the following function:

$$M_n=(M_{n-1}+D_n)/2$$

wherein $D_n$ is the value of the $n^{th}$ portion to be compressed, $M_n$ the divider to be applied to $D_n$ and $M_{n-1}$ the divider applied to the $(n-1)^{th}$ portion.

10. The method of claim 8, further comprising
calculating a quotient difference for said each portion by subtracting from its corresponding quotient the quotient of its preceding portion; and
using the quotient difference for compression.

11. The method of claim 1, wherein each group of pixel values corresponds to an attribute of a color space, and a compression ratio is adjustable according to the attribute.

12. A method for decompressing first compressed data and second compressed data obtained according to the method of claim 1, comprising:
decompressing the first compressed data to obtain MSB portions;
decompressing the second compressed data to obtain LSB portions; and
concatenating the obtained MSB portions and the obtained LSB portions to form groups of pixel data.

13. A variable-length coding method for coding groups of pixel values, comprising, for each pixel value:
calculating a weighted sum of a plurality of pixel values adjacent to said pixel value;
dividing said pixel value by a divider to obtain a quotient and a remainder;
representing the quotient and the remainder by a code that includes a marker bit separating the quotient part of the code and the remainder part of the code; and
wherein the divider is calculated by the following function:

$$M_n=(M_{n-1}+D_n)/2$$

with $D_n$ being the value of the $n^{th}$ portion to be compressed, $M_n$ being the divider to be applied to $D_n$ and $M_{n-1}$ being the divider applied to the $(n-1)^{th}$ portion.

14. The variable-length coding method of claim 13, further comprising:
calculating a quotient difference for said each portion by subtracting from its corresponding quotient the quotient of its preceding portion; and
using the quotient difference for compression.

15. An image processing system, comprising:
a memory buffer for temporarily storing image data;
a processing engine configured to perform an image operation on a target image data based on at least one reference image data; and
a codec interface coupled to the memory buffer and the processing engine and configured to
compress the reference image data before storing the reference image data into the memory buffer;
decompress the compressed reference image data from the memory buffer for use by the processing engine; and
wherein compressing the reference image data comprises:
calculating a variance of the MSB portions of the pixel values of each of a plurality of pixel groups of the reference image data; and
If the variance is less than a predetermined threshold, then
compressing MSB portions of said pixel values into first compressed data and compressing LSB portions of said pixel values into second compressed data; otherwise
compressing said pixel values without separating them into MSB and LSB portions.

16. The image processing system of claim 15, wherein the codec interface:
searches said each group to determine whether there exist at least two pixel values with different LSB portions but the same MSB portions; and
compresses the LSB portions of the at least two pixel values of said each group and the LSB portions of the rest of the pixel values of said each group separately if the at least two pixel values are found.

17. The image processing system of claim 16, wherein the codec interface truncates a subset of the LSB portions before compression if the variance of the MSB portions exceeds a predetermined threshold so that a sum of the amount of the first compressed data and the amount of the second compressed data is less than a predetermined number.

* * * * *